United States Patent
Kim (10) Patent No.: US 10,051,091 B2
(45) Date of Patent: Aug. 14, 2018

(54) NETWORK SYSTEM FOR VEHICLE AND DATA TRANSMISSION METHOD OF HETEROGENEOUS COMMUNICATION CONTROLLERS IN THE SAME SYSTEM

(71) Applicant: Hyundai Motor Company, Seoul (KR)

(72) Inventor: You Keun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 122 days.

(21) Appl. No.: 14/569,665

(22) Filed: Dec. 13, 2014

(65) Prior Publication Data

US 2015/0373158 A1  Dec. 24, 2015

(30) Foreign Application Priority Data

Jun. 24, 2014  (KR) .................. 10-2014-0077145

(51) Int. Cl.
*G06F 15/173* (2006.01)
*H04L 29/06* (2006.01)
*H04L 12/40* (2006.01)

(52) U.S. Cl.
CPC ........ *H04L 69/08* (2013.01); *H04L 12/40189* (2013.01); *H04L 2012/40215* (2013.01); *H04L 2012/40273* (2013.01)

(58) Field of Classification Search
CPC ............... G06F 13/387; G06F 13/4022; G06F 13/4027; G06F 11/3409; G06F 11/3466; B60R 16/0315
See application file for complete search history.

(56) References Cited

U.S. PATENT DOCUMENTS 5,592,623 A * 1/1997 Kurobe .................. H04L 12/44
709/225
6,493,335 B1 * 12/2002 Darcie ................ H04L 12/2801
370/344

(Continued)

FOREIGN PATENT DOCUMENTS

JP  2008-300940 A  12/2008
JP  2012-025390 A  2/2012

(Continued)

*Primary Examiner* — Hamza N Algibhah
*Assistant Examiner* — Hannah S Wang
(74) *Attorney, Agent, or Firm* — Mintz Levin Cohn Ferris Glovsky and Popeo, P.C.; Peter F. Corless (57) ABSTRACT

A network system for a vehicle includes one or more first communication controllers and one or more second communication controllers. The one or more first communication controllers transmit a message in a first communication scheme. The one or more second communication controllers are connected to the one or more first communication controllers through a network and transmit a message in a second communication scheme different from the first communication scheme. When a transmission controller selected from the one or more first communication controllers and the one or more second communication controllers transmits a message, a communication controller using a communication scheme different from that of the selected transmission controller stops its own message transmission and resumes its own message transmission once the message transmission of the selected transmission controller is complete.

12 Claims, 7 Drawing Sheets

(56) References Cited

U.S. PATENT DOCUMENTS

| | | | | |
|---|---|---|---|---|
| 7,277,451 | B1* | 10/2007 | Chen | H04L 1/1887 370/338 |
| 2005/0246477 | A1* | 11/2005 | Adams | G06F 13/4027 710/315 |
| 2008/0225723 | A1* | 9/2008 | Lee | H04J 14/0271 370/235 |
| 2009/0310620 | A1* | 12/2009 | Yoshizawa | H04L 12/413 370/461 |
| 2010/0074198 | A1* | 3/2010 | Morioka | H04L 12/413 370/329 |
| 2013/0294540 | A1* | 11/2013 | Hell | H04L 25/0272 375/295 |
| 2014/0258581 | A1* | 9/2014 | Hartwich | G06F 13/4282 710/307 |
| 2015/0172298 | A1* | 6/2015 | Otsuka | H04L 63/08 726/30 |
| 2015/0222455 | A1* | 8/2015 | Ohtsuka | H04L 25/0272 375/219 |
| 2015/0234774 | A1* | 8/2015 | Sengoku | G06F 13/4295 710/106 |
| 2015/0237174 | A1* | 8/2015 | Brochi | H04L 12/6418 370/474 |
| 2015/0339254 | A1* | 11/2015 | Hartwich | H04L 1/0083 710/106 |
| 2016/0080168 | A1* | 3/2016 | Lieder | H04L 12/40032 370/468 |
| 2016/0234038 | A1* | 8/2016 | Mounier | H04L 12/40032 |
| 2016/0241422 | A1* | 8/2016 | Akita | H04B 3/10 |

FOREIGN PATENT DOCUMENTS

| | | |
|---|---|---|
| JP | 2012-099958 A | 5/2012 |
| JP | 2013-057994 A | 3/2013 |
| KR | 10-2008-0108833 A | 12/2008 |
| KR | 10-2011-0035247 A | 4/2011 |
| WO | WO-2004-032715 A2 | 4/2004 |

\* cited by examiner

NETWORK SYSTEM FOR VEHICLE AND DATA TRANSMISSION METHOD OF HETEROGENEOUS COMMUNICATION CONTROLLERS IN THE SAME SYSTEM

CROSS-REFERENCE TO RELATED APPLICATION

This application claims under 35 U.S.C. § 119(a) priority to and the benefit of Korean Patent Application No. 10-2014-0077145 filed on Jun. 24, 2014, the entire contents of which are incorporated herein by reference.

BACKGROUND (a) Technical Field

The present disclosure relates to a network system for a vehicle and a data transmission method of a heterogeneous communication controller in the same system. More particularly, the present disclosure relates to a network system for a vehicle and a data transmission method of heterogeneous communication controllers in the same system, which enables heterogeneous communication controllers using different communication schemes to transmit data through a network without any gateway.

(b) Related Art

Recently, in vehicle communication networks, the bus load of high-speed controller area networks (CANs) has become overloaded, even during critical situations, due to a rapid increase of electronic devices. In addition, the need to transmit a large amount of data at a high speed between electronic devices has recently increased.

In order to solve these problems, CAN-flexible data (CAN-FD) rate communication, with which speed is increased based on existing CAN communications, has come into the spotlight as an alternative solution. Conventionally, Flexray was applied to some vehicles to solve problems of excessive bus load and the like. However, costs associated with this approach make it less than ideal.

On the other hand, CAN-FD communication is a method for increasing communication speed and data transmission amount based on current CAN communication networks, and hence is an effective approach at a relatively low cost. Thus, CAN-FD communication is considered an alternative plan for solving problems of excessive bus load and the like.

When CAN communication and CAN-FD communication are applied to the same network, an error can occur due to a difference in communication speed between the CAN communication and the CAN-FD communication. Thus, it becomes impossible to recognize signals.

Since the current CAN communication and CAN-FD communication schemes cannot be applied to the same network, two separate networks for CAN communication and CAN-FD communication may be configured. A communication-only gateway for converting signals between the two networks may then be configured in order to communicate data between the CAN communication and CAN-FD communication networks.

However, when the communication-only gateway is used, unit cost increases, and signal delay occurs more frequently than when the gateway is not used. Therefore, the performance of a controller may deteriorate when the controller needs to perform a function.

RELATED ART DOCUMENT (Patent Document 1) Korean Patent Application Publication No. 2008-0108833 (2008. 12. 16)

SUMMARY OF THE DISCLOSURE

The present disclosure provides a network system for a vehicle and a data transmission method of heterogeneous communication controllers in the same system, which enables heterogeneous communication controllers using different communication schemes to transmit data through a network without any gateway.

In one aspect, the present disclosure provides a network system for a vehicle, including: one or more first communication controllers configured to transmit messages in a first communication scheme; and one or more second communication controllers connected to the one or more first communication controllers through a network and configured to transmit messages in a second communication scheme different from the first communication scheme, wherein, when a transmission controller selected from the one or more first communication controllers and the one or more second communication controllers transmits a message, a communication controller using a communication scheme different from that of the selected transmission controller stops its own message transmission and resumes its own message transmission once the message transmission of the selected transmission controller is complete.

The selected transmission controller may be sequentially selected based on an identifier (ID) field of an arbitration field that determines a message transmission priority order among messages transmitted from the one or more first and second communication controllers.

The communication controllers other than the selected transmission controller may decide whether the communication scheme of the other communication controllers is identical to that of the selected transmission controller by comparing the communication scheme of the other communication controllers to that of the selected transmission controller using a next bit after an identifier extension (IDE) bit in a control field constituting a standard data frame.

When the selected transmission controller uses the first communication scheme, which is different from the second communication scheme, the one or more second communication controllers may stop communication participation when a communication speed of a standard data frame of the one or more second communication controllers is different from that of a standard data frame of the selected transmission controller and resume communication participation once the message transmission of the selected transmission controller is complete.

When the selected transmission controller uses the second communication scheme, which is different from the first communication scheme, the one or more first communication controllers may stop communication participation when a communication speed of a standard data frame of the one or more first communication controllers is different from that of a standard data frame of the selected transmission controller and resume communication participation once the message transmission of the selected transmission controller is complete.

Each communication controller using a communication scheme different from that of the selected transmission controller may calculate a waiting time based on a data frame of the selected transmission controller and then neglect a signal of the selected transmission controller, received during the calculated waiting time, without processing the signal as an error.

Each communication controller using a communication scheme different from that of the selected transmission controller may calculate a waiting time based on a data frame of the selected transmission controller. The communication controller may calculate the waiting time based on a transmission time of an acknowledge (ACK) field in the data frame of the selected transmission controller.

Either one of the first and second communication controllers may be a controller area network (CAN) communication controller using a CAN communication scheme, while the other one of the first and second communication controllers may be a CAN-flexible data (CAN-FD) communication controller using a CAN-FD communication scheme.

A diagnostic connector that diagnoses an error of a communication network may be connected to the first and second communication controllers through the network. The diagnostic connector may use the first or second communication schemes.

In another aspect, the present disclosure provides a data transmission method of heterogeneous communication controllers in a network system for a vehicle, the data transmission method including: connecting, to a network, one or more first communication controllers that transmit messages in a first communication scheme; connecting, to the network, one or more second communication controllers that transmit messages in a second communication scheme different from the first communication scheme; selecting a transmission controller that transmits a message from the one or more first communication controllers and the one or more second communication controllers; and comparing the first communication scheme and the second communication scheme to that of the selected transmission controller, wherein a communication controller using a communication scheme different from that of the selected transmission controller stops its own message transmission and resumes its own message transmission once the message transmission of the selected transmission controller is complete.

In the selecting of the transmission controller, the selected transmission controller may be sequentially determined selected based on an ID field of an arbitration field that determines a message transmission priority order among messages transmitted from the one or more first and second communication controllers.

The comparing of the first communication scheme and the second communication scheme to that of the selected transmission controller may include: deciding a communication scheme of the selected transmission controller using a next bit after an IDE bit in a control field constituting a standard data frame; and deciding whether the communication scheme of communication controllers other than the selected transmission controller is identical to that of the selected transmission controller by comparing the communication scheme of the other communication controllers to that of the selected transmission controller.

When it is decided that the selected transmission controller uses the first communication scheme, which is different from the second communication scheme, the one or more second communication controllers may stop communication participation when a communication speed of a standard data frame of the one or more second communication controllers is different from that of a standard data frame of the selected transmission controller and resumes communication participation once the message transmission of the selected transmission controller is complete.

When it is decided that the selected transmission controller uses the second communication scheme, which is different from the first communication scheme, the one or more first communication controllers may stop communication participation when a communication speed of a standard data frame of the one or more first communication controllers is different from that of a standard data frame of the selected transmission controller and resumes communication participation once the message transmission of the selected transmission controller is complete.

Each communication controller using a communication scheme different from that of the selected transmission controller may calculate a waiting time based on a data frame of the selected transmission controller and then neglect a signal of the selected transmission controller, received during the calculated waiting time, without processing the signal as an error.

Each communication controller using a communication scheme different from that of the selected transmission controller may calculate a waiting time based on a data frame of the selected transmission controller. The communication controller may calculate the waiting time based on a transmission time of an ACK field in the data frame of the selected transmission controller.

Either one of the first and second communication controllers may be a CAN communication controller using a CAN communication scheme, while the other one of the first and second communication controllers may be a CAN-FD communication controller using a CAN-FD communication scheme.

According to the present disclosure, the following effects can be obtained.

First, the CAN and CAN-FD communication controllers are combined and applied in the same network without using any communication-only gateway, so that it is possible to prevent an increase in unit cost, caused by applying a conventional gateway in communication between CAN and CAN-FD networks, and to perform fast data processing between the two communication networks. That is, it is possible to delete the communication-only gateway, and unit cost can be reduced, as a result. Further, fast data transmission/reception between controllers can be achieved.

Second, when some controllers in a vehicle are converted into CAN-FD communication controllers, only the required controllers are converted into the CAN-FD communication controllers without changing all communication schemes of controllers in the vehicle, and the network can be maintained without additionally forming a network. Thus, only a portion of software development cost associated with the controllers, which use different communications such as CAN and CAN-FD is generated, so that it is possible to reduce investment cost and to produce significant results compared with low cost.

Third, the degree of freedom in forming of a network can be improved. Further, the number of networks is decreased as compared with the conventional techniques, so that it is possible to reduce unit cost of a wiring/connector component for forming the network.

The above and other features of the disclosure are discussed infra.

BRIEF DESCRIPTION OF THE DRAWINGS

The above and other features of the present disclosure will now be described in detail with reference to embodiments thereof as illustrated in the accompanying drawings, which are given hereinbelow by way of illustration only, and thus are not limitative of the present disclosure, wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. Reference numbers refer to the same or equivalent parts of the present disclosure throughout the several figures of the drawing.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for performing a data transmission method of a heterogeneous communication controller in a network system for a vehicle.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

The present disclosure provides a method for combining and applying controllers using different communication protocols in a network in order to prevent an increase in unit cost, caused by applying a conventional gateway in communication between CAN and CAN-FD communication networks, and in order to perform fast data processing between the two communication networks. That is, in the present disclosure, when two networks using different communication protocols are connected to perform data transmission, controllers using heterogeneous communication schemes with different communication speeds are combined and applied in a single network, without using any communication-only gateway for connection between the heterogeneous networks.

Figure 1:
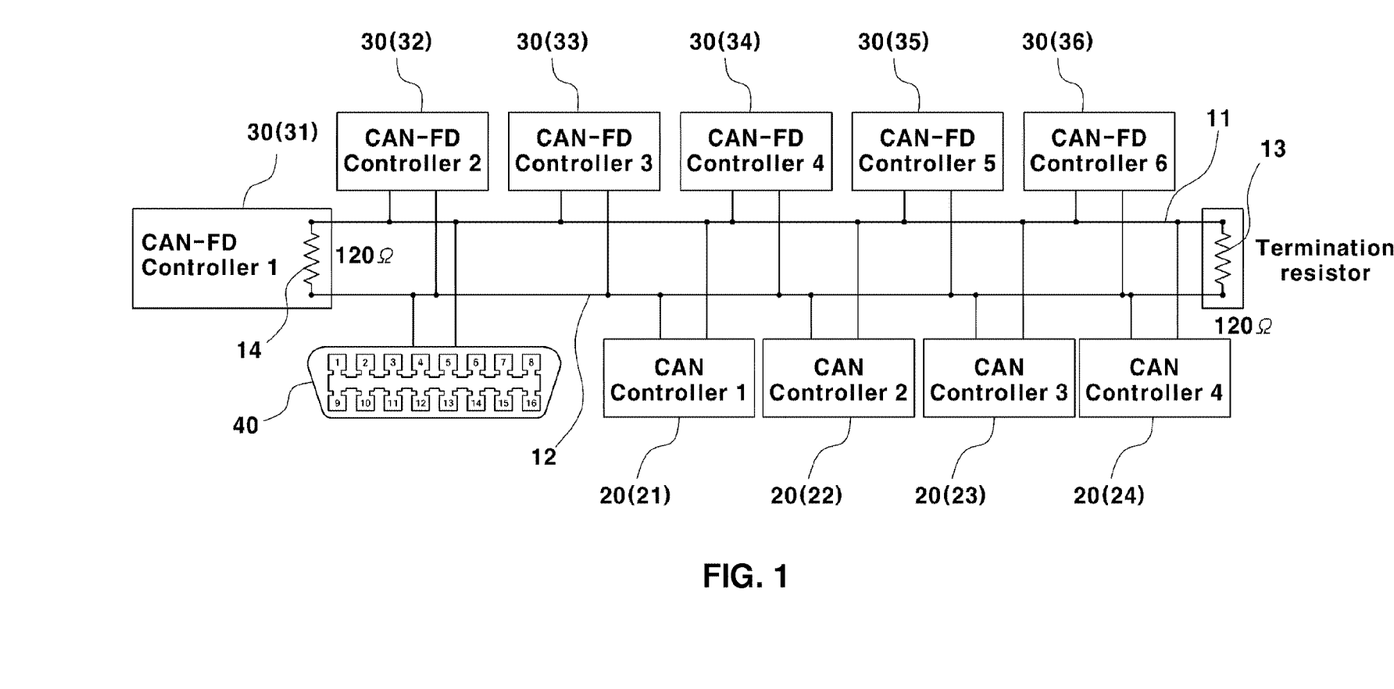
FIG. 1 is a configuration view schematically illustrating a network system for a vehicle according to embodiments of the present disclosure.

Accordingly, a network system for a vehicle according to embodiments of the present disclosure is a network system inside a vehicle, which performs communication between electronic components in the vehicle. As shown in FIG. 1, the network system may be configured to include one bus 10 formed by twisting two strands of wires 11 and 12, and a plurality of controllers 20 and 30 connected to the bus 10.

Termination resistors 13 and 14 (generally, using 120Ω) are respectively connected to both ends of the bus 10, and the controllers 20 and 30 are configured with a plurality of CAN communication controllers (alternatively referred to herein as "first communication controllers") 20 using a CAN communication protocol (alternatively referred to herein as a "first communication scheme") and a plurality of CAN-FD communication controllers (alternatively referred to herein as "second communication controllers") 30 using a CAN-FD communication protocol (alternatively referred to herein as a "second communication scheme"). The CAN communication controllers 20 and the CAN-FD communication controllers 30 are all (simultaneously) connected to the bus 10, to transmit data through the bus 10. That is, in the network system according to embodiments of the present disclosure, the heterogeneous communication controllers 20 and 30 using different communication schemes (e.g., protocols) are simultaneously connected to the same network, and perform data transmission through the same network without any existing communication only gateway. For the purposes of the present disclosure, the communication scheme used by the one or more first communication controllers may alternatively be referred to as a "first communication scheme," whereas the communication scheme used by the one or more second communication controllers may alternatively be referred to as a "second communication scheme."

The network system may be configured to include a diagnostic connector 40 for diagnosing a data transmission error occurring in a network. The diagnostic connector 40 may be configured to be simultaneously connected to the bus 10. In this state, a diagnostic connector generally applied to a communication network inside a vehicle may be used as the diagnostic connector 40. The technique for diagnosing the occurrence of an error in the network through the diagnostic connector is a technique known in the art, and therefore, its detailed description will be omitted.

However, when an occurrence of an error in the network is diagnosed, the diagnostic connector 40 is applied to both the CAN and CAN-FD communication networks to diagnose the occurrence of an error. When the diagnostic connector 40 is connected to the network, the diagnostic connector 40 may be treated as one communication controller. That is, the diagnostic connector 40 is a communication controller for diagnosing an error of a communication network. The diagnostic connector 40 diagnoses an error of the communication network through a process of transmitting and receiving messages. When a communication network error is diagnosed, the diagnostic connector 40 uses the same communication scheme as the first or second communication controller 20 or 30 (e.g., the first or second communication scheme). In the network system configured as described above, each controller selects and employs a communication scheme suitable for its function performance among CAN and CAN-FD communications.

Hereinafter, a data transmission method of heterogeneous communication controllers using one same network in the network system will be described. Before the description of the method, the structures of CAN and CAN-FD communication messages will be described.

Figure 2:
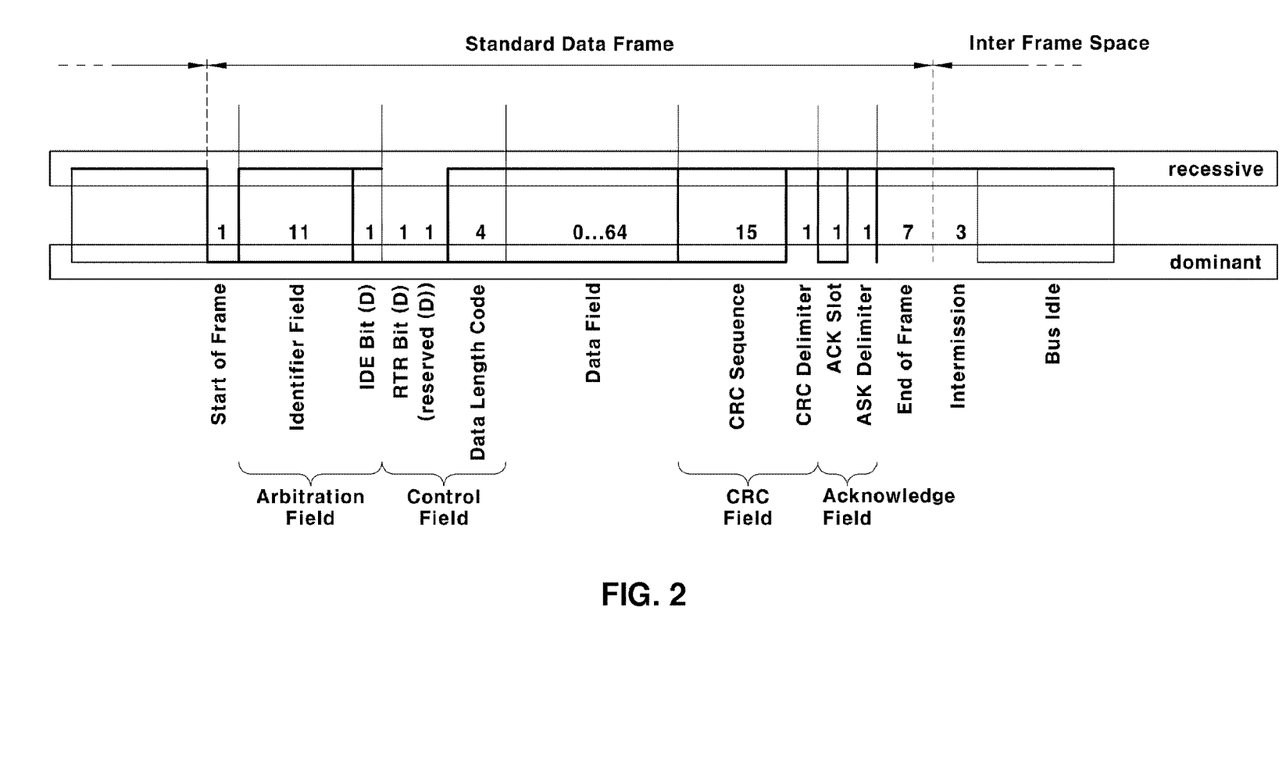
FIG. 2 is a view illustrating the structure of a general high-speed CAN communication message.
Figure 3:
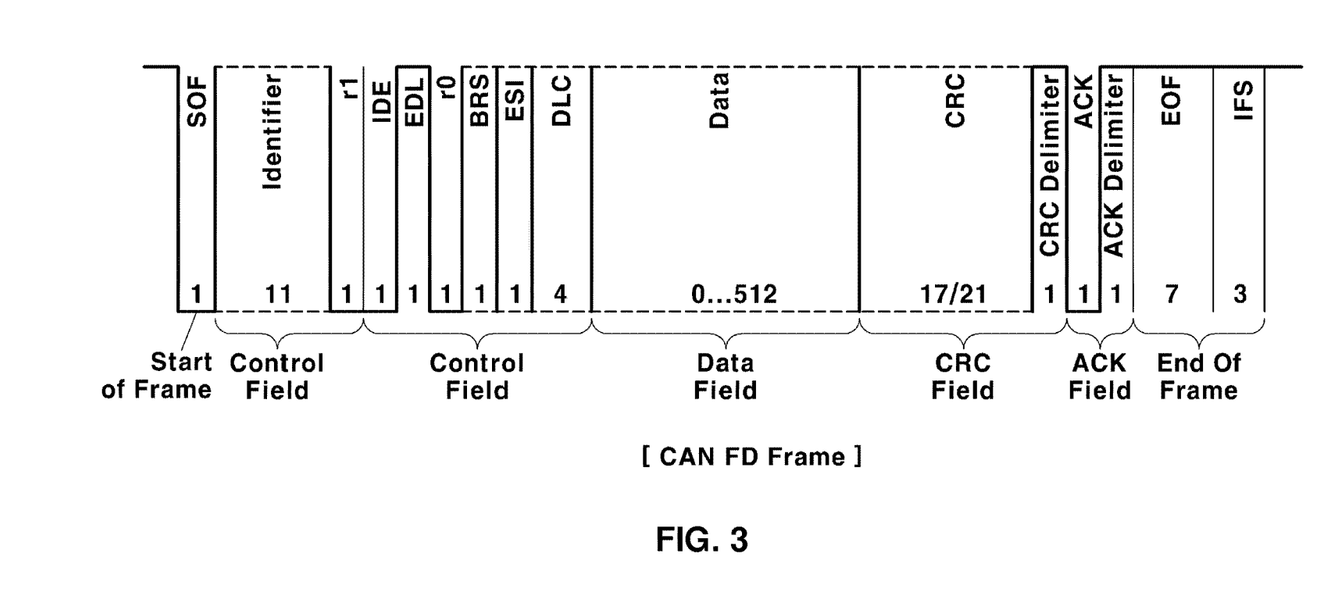
FIG. 3 is a view illustrating the structure of a general CAN-FD communication message.

FIG. 2 illustrates the structure of a high-speed CAN communication message, and FIG. 3 illustrates the structure of a CAN-FD communication message. The CAN communication message is configured to include a standard data frame shown in FIG. 2. The maximum communication speed of transmittable data is 1 Mbps, and the maximum data amount of transmittable data is 8 bytes (64 bits).

As shown in FIG. 2, a start of frame (SOF) of 1 bit, an arbitration field of 12 bits, a control field of 6 bits, a data field of 64 bits, a cyclic redundancy check (CRC) field of 16 bits, an acknowledge (ACK) field of 2 bits and an end of frame (EOF) of 7 bits are sequentially configured in the standard data frame. An identifier (ID) field of 11 bits, which determines a message transmission priority order, is included in the arbitration field, and a CRC sequence of 15 bits and a CRC delimiter of 1 bit are configured in the CRC field. The CAN-FD communication message is configured to include a standard data frame shown in FIG. 3. The maximum communication speed of transmittable data is 15 Mbps, and the maximum data amount of transmittable data is 64 bytes (512 bits).

As shown in FIG. 3, an SOF of 1 bit, an arbitration field of 12 bits, a control field of 9 bits, a data field of 512 bits, a CRC field of 18 bits or 22 bits, an ACK field of 2 bits and an EOF of 10 bits are sequentially configured in the standard data frame. Like the CAN communication message, an ID field of 11 bits, which determines a message transmission priority order, is included in the arbitration field, and a CRC sequence of 17 bits (when the data field is 16 bytes or less) or 21 bits (when the data field exceeds 16 bytes) and a CRC delimiter of 1 bit are configured in the CRC field.

Figure 4:
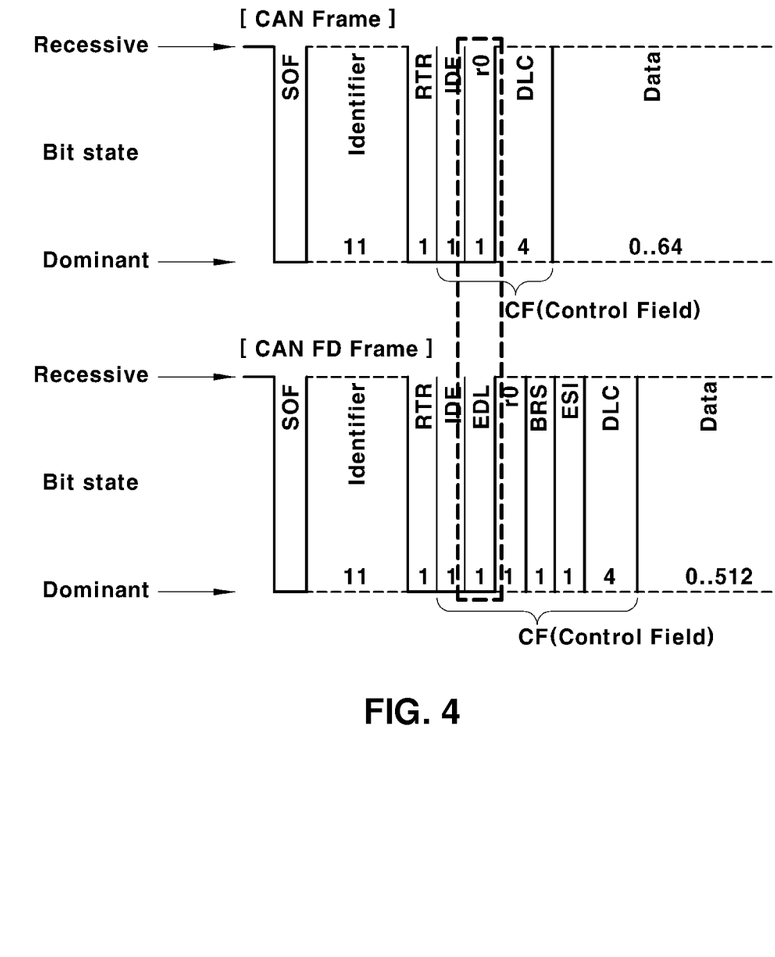
FIG. 4 is a view comparing the structures of standard data frames of CAN and CAN-FD communication messages using the network system according to embodiments of the present disclosure.

FIG. 4 is a view comparing the structures of the data frames of the CAN and CAN-FD communication messages, and it can be seen that the CAN and CAN-FD communication messages have different bit states in the control fields of the standard data frames. Accordingly, the communication speeds of data are different from each other in the control fields. Therefore, when two different communication schemes are applied in the same network, a communication error occurs due to a difference between the communication speeds.

Accordingly, in the present disclosure, it is determined that the difference in communication speed between the CAN and CAN-FD communications is normal, and the difference in communication is not processed as an error, so that heterogeneous communication controllers using different communication protocols can perform data transmission in one same network. In other words, a controller having a communication scheme different from a transmission controller by determining communication schemes before a difference in communication speed between the CAN and CAN-FD communications neglects signals until when the message (data) transmission of the transmission controller is completed, and does not process the difference in communication speed as an error.

To this end, each of the CAN and CAN-FD communication controllers, i.e., controllers in a single network, receives and identifies r0 (e.g., in the CAN communication message) that is the next bit after an identifier extension (IDE) bit of the message or an extended data length (EDL) bit (e.g., in the CAN-FD communication message), thereby deciding the communication scheme of the transmission controller. For example, if the next bit after the IDE bit is identified as a dominant (e.g., '0'), each heterogeneous communication controller decides that the transmission controller uses the CAN communication scheme. If the next bit after the IDE bit is identified as a recessive (e.g., '1'), each heterogeneous communication controller decides that the transmission controller uses the CAN-FD communication scheme.

Referring to FIG. 4, in the CAN communication message, an identifier extension (IDE) of 1 bit, a reserved bit (r0) of 1 bit and a data length code (DLC) of 4 bits are sequentially configured in the control field of the standard data frame. In the CAN-FD communication message, an IDE of 1 bit, an extended data length (EDL) of 1 bit, an r0 of 1 bit, a bit rate switch (BRS) of 1 bit, an error state indicator (ESI) of 1 bit and a DLC of 4 bits are sequentially configured in the control field of the standard data frame. That is, the next bit (r0)after the IDE bit is '0 in' the CAN communication, and on the contrary, the next bit (EDL)after the IDE bit is '1' in the CAN-FD communication.

Each communication controller identifies and decides a communication scheme of the transmission controller through the r0 (e.g., in the CAN communication) or the EDL (e.g., in the CAN-FD communication), which is the next bit after the IDE bit. Then, if the communication scheme of the transmission controller is different from that of the communication controller, the communication controller does not process a transmission signal (e.g., message) of the transmission controller as an error and neglects the transmission signal until the message transmission of the transmission controller is completed.

In this state, the transmission controller is sequentially determined by the ID field that determines a message transmission priority order in the data frame, and the other controllers except the transmission controller (the CAN and CAN-FD communication controllers except one transmission controller) sense and recognize the communication scheme of the transmission controller through the received r0 or ELD bit of the transmission controller. That is, when it is decided that each communication controller except the transmission controller has a communication scheme (identified with the next bit after the IDE bit) different from that of the transmission controller, the communication controller recognizes that the communication scheme of the communication controller is different from that of the transmission controller. Subsequently, the reception controllers (i.e., the other communication controllers except the transmission controller) stop communication participation (the CAN communication stops communication participation after the r0 of the control field, and the CAN-FD communication stops communication participation after the EDL of the control field) and wait until the message transmission of the transmission controller is completed.

Figure 5:
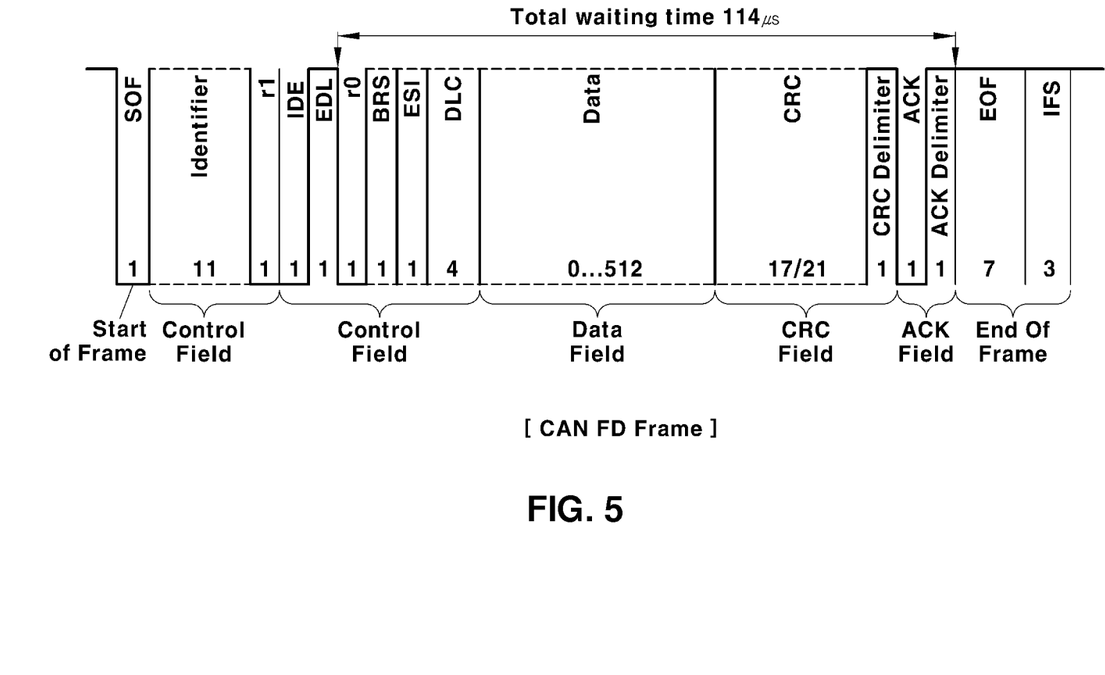
FIG. 5 is a view illustrating a waiting time of a CAN communication controller when a CAN-FD communication controller transmits a message in the network system according to embodiments of the present disclosure.

FIG. 5 is a view illustrating a waiting time of the CAN communication controller when the CAN-FD communication controller transmits a message in the network system according to embodiments of the present disclosure.

As an example, it is assumed that the CAN communication controller has a communication speed of 500 Kbps, a data length of 8 bytes (64 bits) and a per-bit transmission time of 2 μs, and the CAN-FD communication controller has a communication speed of 5 Mbps, a data length of 64 bytes (512 bits) and a per-bit transmission time of 200 ns. When the CAN-FD communication controller transmits a message, the CAN communication controller stops message transmission after sensing a communication protocol of the transmission controller (i.e., CAN-FD communication controller), and resumes transmission once the message transmission of the transmission controller is complete.

The CAN communication controller calculates a waiting time based on the CAN-FD data frame (e.g., standard data frame of a message transmitted by the CAN-FD communication controller). Then, the CAN communication controller stops message transmission during the waiting time and waits until the transmission of the CAN-FD communication message (e.g., CAN-FD data) is completed through an internal counter. In this state, the CAN communication controller does not process a CAN-FD signal received during the waiting time as an error and neglects the CAN-FD signal.

The CAN communication controller stops message transmission and waits after sensing that the message transmission scheme (e.g., communication protocol) of the CAN communication controller is different from that of the transmission controller (e.g., CAN-FD communication controller) through identification of the EDL bit of the CAN-FD data frame. Thus, referring to FIG. 5, the waiting time of the CAN communication controller can be calculated as a transmission time from the r0 to ACK delimiter of the CAN-FD data frame (i.e., from after the EDL to before the EOF). Therefore, waiting time of CAN communication controller=3 bits*2 μs/bit+540 bits*200 ns/bit=6 μs+108 μs=114 μs.

The communication speed of the arbitration field of the CAN communication is equal to that of the arbitration field of the CAN-FD communication, which is 500 kps. However, the communication speed of the arbitration field is not 500 kbps but may be another value. However, the communication speed of the arbitration field of the CAN communication is necessarily equal to that of the arbitration field of the CAN-FD communication. After the waiting time elapses, the CAN communication controller normally participates in communication. If message transmission is determined by deciding the message transmission based on an ID order, the CAN communication controller starts the message transmission. That is, the CAN communication controller senses that the waiting time elapses through the internal counter during the time when the message (e.g., data) transmission of the CAN-FD communication controller is completed, and participates in network communication after the waiting time elapses.

As another example, it is assumed that the CAN communication controller has a communication speed of 500 Kbps, a data length of 8 bytes (64 bits) and a per-bit transmission time of 2 μs, and the CAN-FD communication controller has a communication speed of 5 Mbps, a data length of 64 bytes (512 bits) and a per-bit transmission time of 200 ns. When the CAN communication controller transmits a message, the CAN-FD communication controller stops message transmission after sensing a communication protocol of the transmission controller (e.g., CAN communication controller), and resumes transmission once the message transmission of the transmission controller is complete.

The CAN-FD communication controller calculates a waiting time based on the CAN data frame (e.g., standard data frame of a message transmitted by the CAN communication controller). Then, the CAN-FD communication controller stops message transmission during the waiting time and waits until the transmission of the CAN communication message (e.g., CAN data) is completed through an internal counter. In this state, the CAN-FD communication controller does not process a CAN signal received during the waiting time as an error and neglects the CAN signal.

Figure 6:
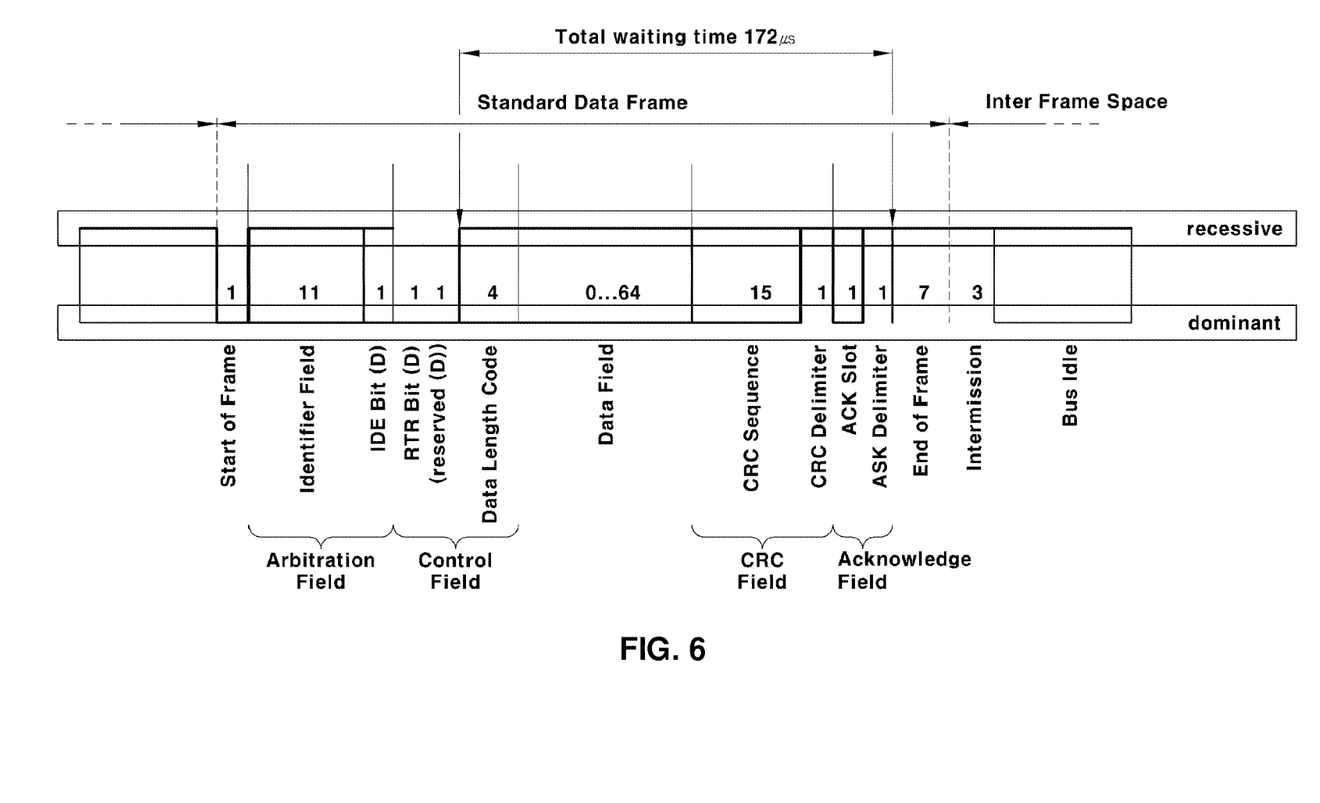
FIG. 6 is a view illustrating a waiting time of the CAN-FD communication controller when the CAN communication controller transmits a message in the network system according to embodiments of the present disclosure.

The CAN-FD communication controller stops communication participation and waits after sensing that the message transmission scheme (e.g., communication protocol) of the CAN-FD communication controller is different from that of the transmission controller (e.g., CAN communication controller) through identification of the next bit (DEL) after the IDE bit. Thus, referring to FIG. 6, the waiting time of the CAN-FD communication controller can be calculated as a transmission time from the reserved bit to ACK delimiter of the CAN data frame (i.e., from after the DLC to before the EOF). Therefore, waiting time of CAN-FD communication controller={4 bits (DLC)+64 bits (Data)+16 bits (CRC)+2 bits (ACK)}*2 μs/bit=86 bits*2 μs/bit=172 μs.

Here, the reason why the transmission time of the ACK field is included in the waiting time of the communication controller is that the CAN communication and the CAN-FD communication do not recognize their signals as normal signals and neglects the signals due to a difference in communication speed therebetween. Thus, it is unnecessary to separately transmit an ACK signal. The communication controller waits by allowing even the ACK field to be included in the waiting time of the controller, thereby reducing waveform distortion of the transmission message. If the waiting time elapses, the waiting communication controller (e.g., CAN-FD communication controller) participates in normal network communication, and subsequently transmits the message of which transmission is stopped. That is, during the time when the message (e.g., data) transmission of the CAN communication controller is completed, the CAN-FD communication controller senses that the waiting time elapses through the internal counter, and normally returns to the network communication from after the waiting time elapses.

The waiting time of the CAN or CAN-FD communication controller is changed depending on the communication speed and data length. That is, the waiting time of the controller may be changed depending on a communication speed and a data length, set when the CAN or CAN-FD communication is applied for each kind of vehicle.

Figure 7:
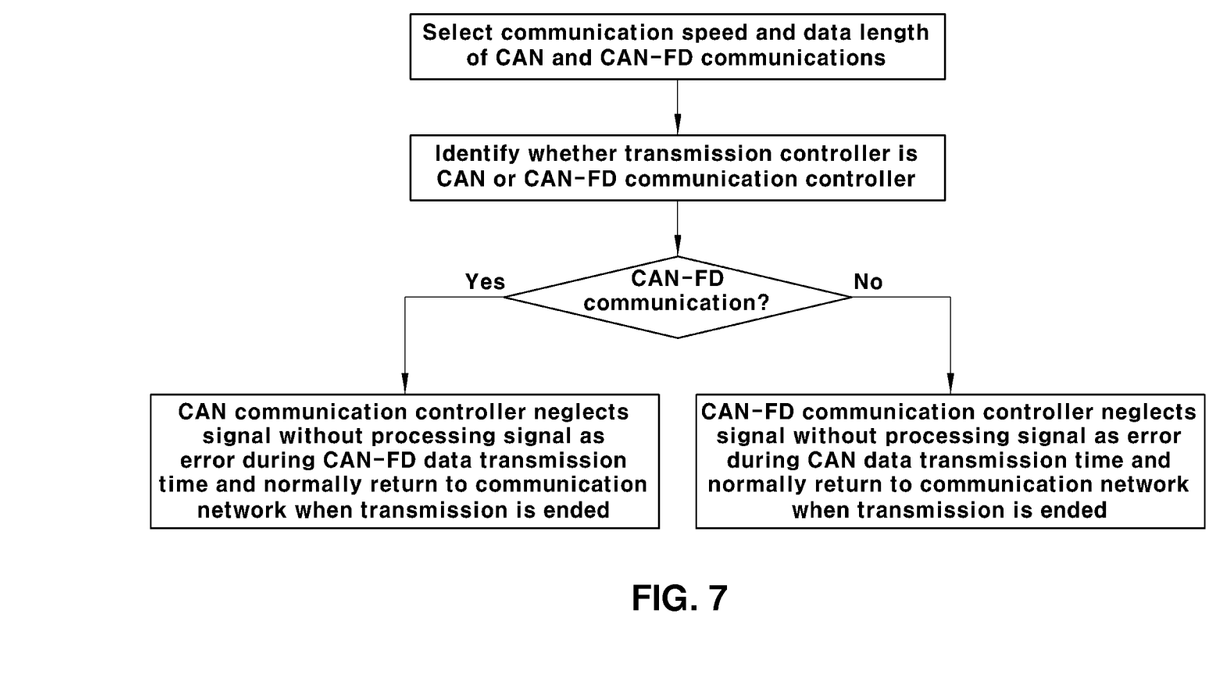
FIG. 7 is a flowchart illustrating a data transmission method of heterogeneous communication controllers using the same network in the network system according to embodiments of the present disclosure.

Therefore, as shown in FIG. 7, the communication speed and data length of each of the CAN and CAN-FD communication controllers are appropriately selected before the data (e.g., message) transmission. Subsequently, the communication scheme of the transmission controller is sensed in the data transmission (i.e., it is identified which communication scheme of the CAN and CAN-FD communications the transmission controller employs). If the transmission controller uses the CAN-FD communication, the CAN communication controller neglects a data signal without processing the data signal as an error during the transmission time of CAN-FD data, and normally returns to the communication network when the transmission of the CAN-FD data is completed. If the transmission controller uses the CAN communication, the CAN-FD communication controller neglects a data signal without processing the data signal as an error during the transmission time of CAN data, and normally returns to the communication network when the transmission of the CAN data is completed.

As described above, in the network system of the present disclosure, it is possible to perform data transmission/reception between CAN communication controllers and data transmission/reception between CAN-FD communication controllers. In addition, when a microcomputer of the CAN-FD communication controller supports the CAN communication, the CAN-FD communication controller can receive data of the CAN communication controller. Since the data transmission/reception between the CAN communication controllers is possible, a controller using only CAN communication is necessarily selected in advance when a network architecture is designed. Furthermore, in the network system of the present disclosure, when some controllers in a vehicle are required to use the CAN-FD communication, only the required controllers are converted into CAN-FD communication controllers without changing all the controllers using the CAN communication scheme in the vehicle, thereby forming a network. Thus, it is possible to reduce cost and to expect a high returns.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A network system for a vehicle, comprising:
one or more first communication controllers configured to transmit messages in a first communication scheme; and
one or more second communication controllers connected to the one or more first communication controllers through a network and configured to transmit messages in a second communication scheme different from the first communication scheme, wherein
when a transmission controller selected from the one or more first communication controllers and the one or more second communication controllers transmits a message, a communication controller using a communication scheme different from that of the selected transmission controller stops its own message transmission and resumes its own message transmission once the message transmission of the selected transmission controller is complete,
an identifier extension (IDE) of 1 bit, a reserved bit (r0) of 1 bit, and a data length code (DLC) of 4 bits are sequentially configured in a control field of a standard data frame of the messages transmitted by the one or more first communication controllers in the first communication scheme,
an IDE of 1 bit, an extended data length (EDL) of 1 bit, an r0 of 1 bit, a bit rate switch (BRS) of 1 bit, an error state indicator (ESI) of 1 bit, and a DLC of 4 bits are sequentially configured in a control field of a standard data frame of the messages transmitted by the one or more second communication controllers in the second communication scheme,
when a non-selected communication controller recognizes that the communication scheme of the non-selected communication controller, identified with a next bit after the IDE bit of the control field, is different from that of the selected transmission controller, the non-selected communication controller stops communication participation after the r0 of the control field or after the EDL of the control field, and waits until the message transmission of the selected transmission controller is completed,
either one of the first and second communication controllers is a controller area network (CAN) communication controller using a CAN communication scheme, while the other one of the first and second communication controllers is a CAN-flexible data (CAN-FD) communication controller using a CAN-FD communication scheme,
when the non-selected communication controller is the CAN communication controller using the CAN communication scheme, the CAN communication controller stops the communication participation after the r0 of the control field, and calculates a waiting time based on a bit-length of a predefined portion of a CAN-FD data frame and a first communication speed and a second communication speed of the CAN-FD communication controller, wherein the predefined portion of the CAN-FD data frame is a next bit after the EDL to an ACK delimiter bit of the CAN-FD data frame, and
when the non-selected communication controller is the CAN-FD communication controller using the CAN-FD communication scheme, the CAN-FD communication controller stops the communication participation after the EDL of the control field, and calculates the waiting time based on a bit-length of a predefined portion of a CAN data frame and a communication speed of the CAN communication controller, wherein the predefined portion of the CAN data frame is a next bit after the r0 to an ACK delimiter bit of the CAN data frame.

2. The network system of claim 1, wherein the selected transmission controller is sequentially selected based on an identifier (ID) field of an arbitration field that determines a message transmission priority order among messages transmitted from the one or more first and second communication controllers.

3. The network system of claim 1, wherein, when the selected transmission controller uses the second communication scheme, which is different from the first communication scheme, the one or more first communication controllers stop communication participation when a communication speed of a standard data frame of the one or more first communication controllers is different from that of a standard data frame of the selected transmission controller and resume communication participation once the message transmission of the selected transmission controller is complete.

4. The network system of claim 1, wherein each communication controller using a communication scheme different from that of the selected transmission controller calculates a waiting time based on a data frame of the selected transmission controller and then neglects a signal of the selected transmission controller, received during the calculated waiting time, without processing the signal as an error.

5. The network system of claim 1, wherein each communication controller using a communication scheme different from that of the selected transmission controller calculates a waiting time based on a data frame of the selected transmission controller, and the waiting time includes a transmission time of an acknowledge (ACK) field in the data frame of the selected transmission controller.

6. The network system of claim 1, wherein a diagnostic connector that diagnoses an error of a communication network is connected to the first and second communication controllers through the network and uses the first or second communication scheme.

7. A data transmission method of heterogeneous communication controllers in a network system for a vehicle, the data transmission method comprising:
   connecting, to a network, one or more first communication controllers that transmit messages in a first communication scheme;
   connecting, to the network, one or more second communication controllers that transmit messages in a second communication scheme different from the first communication scheme;
   selecting a transmission controller that transmits a message from the one or more first communication controllers and the one or more second communication controllers; and
   comparing the first communication scheme and the second communication scheme to that of the selected transmission controller, wherein
   a communication controller using a communication scheme different from that of the selected transmission controller stops its own message transmission and resumes its own message transmission once the selected message transmission of the transmission controller is complete,
   an identifier extension (IDE) of 1 bit, a reserved bit (r0) of 1 bit, and a data length code (DLC) of 4 bits are sequentially configured in a control field of a standard data frame of the messages transmitted by the one or more first communication controllers in the first communication scheme,
   an IDE of 1 bit, an extended data length (EDL) of 1 bit, an r0 of 1 bit, a bit rate switch (BRS) of 1 bit, an error state indicator (ESI) of 1 bit, and a DLC of 4 bits are sequentially configured in a control field of a standard data frame of the messages transmitted by the one or more second communication controllers in the second communication scheme,
   when a non-selected communication controller recognizes that the communication scheme of the non-selected communication controller, identified with a next bit after the IDE bit of the control field, is different from that of the selected transmission controller, the non-selected communication controller stops communication participation after the r0 of the control field or after the EDL of the control field, and waits until the message transmission of the selected transmission controller is completed,
   either one of the first and second communication controllers is a controller area network (CAN) communication controller using a CAN communication scheme, while the other one of the first and second communication controllers is a CAN-flexible data (CAN-FD) communication controller using a CAN-FD communication scheme,
   when the non-selected communication controller is the CAN communication controller using the CAN communication scheme, the CAN communication controller stops the communication participation after the r0 of the control field, and calculates a waiting time based on a bit-length of a predefined portion of a CAN-FD data frame and a first communication speed and a second communication speed of the CAN-FD communication controller, wherein the predefined portion of the CAN-FD data frame is a next bit after the EDL to an ACK delimiter bit of the CAN-FD data frame, and
   when the non-selected communication controller is the CAN-FD communication controller using the CAN-FD communication scheme, the CAN-FD communication controller stops the communication participation after the EDL of the control field, and calculates the waiting time based on a bit-length of a predefined portion of a CAN data frame and a communication speed of the CAN communication controller, wherein the predefined portion of the CAN data frame is a next bit after the r0 to an ACK delimiter bit of the CAN data frame.

8. The data transmission method of claim 7, wherein, in the selecting of the transmission controller, the selected transmission controller is sequentially selected based on an ID field of an arbitration field that determines a message transmission priority order among messages transmitted from the one or more first and second communication controllers.

9. The data transmission method of claim 7, wherein, when it is decided that the selected transmission controller uses the second communication scheme, which is different from the first communication scheme, the one or more first communication controllers stop communication participation when a communication speed of a standard data frame of the one or more first communication controllers is different from that of a standard data frame of the selected transmission controller and resumes communication participation once the message transmission of the selected transmission controller is complete.

10. The data transmission method of claim 7, wherein each communication controller using a communication scheme different from that of the selected transmission controller calculates a waiting time based on a data frame of the selected transmission controller and then neglects a signal of the selected transmission controller, received during the calculated waiting time, without processing the signal as an error.

11. The data transmission method of claim 7, wherein each communication controller using a communication scheme different from that of the selected transmission controller calculates a waiting time based on a data frame of the selected transmission controller, and the waiting time includes a transmission time of an ACK field in the data frame of the selected transmission controller.

12. A network system for a vehicle, comprising:
one or more first communication controllers configured to transmit messages in a first communication scheme; and
one or more second communication controllers connected to the one or more first communication controllers through a network and configured to transmit messages in a second communication scheme different from the first communication scheme, wherein
when a transmission controller selected from the one or more first communication controllers and the one or more second communication controllers transmits a message, a communication controller using a communication scheme different from that of the selected transmission controller stops its own message transmission and resumes its own message transmission once the message transmission of the selected transmission controller is complete,
the network is configured to include one bus formed by twisting two strands of wires of a first strand and a second strand, and two termination resistors which are respectively connected to both ends of the first strand and the second strand,
the one or more first communication controllers and the one or more second communication controllers are connected simultaneously to the first strand and the second strand of the one bus,
either one of the first and second communication controllers is a CAN communication controller using a CAN communication scheme, while the other one of the first and second communication controllers is a CAN-FD communication controller using a CAN-FD communication scheme,
an identifier extension (IDE) of 1 bit, a reserved bit (r0) of 1 bit, and a data length code (DLC) of 4 bits are sequentially configured in a control field of a standard data frame of the messages transmitted by the one or more first communication controllers in the first communication scheme,
an IDE of 1 bit, an extended data length (EDL) of 1 bit, an r0 of 1 bit, a bit rate switch (BRS) of 1 bit, an error state indicator (ESI) of 1 bit, and a DLC of 4 bits are sequentially configured in a control field of a standard data frame of the messages transmitted by the one or more second communication controllers in the second communication scheme,
when a non-selected communication controller recognizes that the communication scheme of the non-selected communication controller, identified with a next bit after the IDE bit of the control field, is different from that of the selected transmission controller, the non-selected communication controller stops communication participation after the r0 of the control field or after the EDL of the control field, and waits until the message transmission of the selected transmission controller is completed,
when the non-selected communication controller is the CAN communication controller using the CAN communication scheme, the CAN communication controller stops the communication participation after the r0 of the control field, and calculates a waiting time based on a bit-length of a predefined portion of a CAN-FD data frame and a first communication speed and a second communication speed of the CAN-FD communication controller, wherein the predefined portion of the CAN-FD data frame is a next bit after the EDL to an ACK delimiter bit of the CAN-FD data frame, and
when the non-selected communication controller is the CAN-FD communication controller using the CAN-FD communication scheme, the CAN-FD communication controller stops the communication participation after the EDL of the control field, and calculates the waiting time based on a bit-length of a predefined portion of a CAN data frame and a communication speed of the CAN communication controller, wherein the predefined portion of the CAN data frame is a next bit after the r0 to an ACK delimiter bit of the CAN data frame.

* * * * *